United States Patent [19]

Steinhauser et al.

[11] Patent Number: 5,085,490
[45] Date of Patent: Feb. 4, 1992

[54] ELECTRIC-MOTOR-DRIVABLE PRESSURE GENERATOR FOR A HYDRAULIC BRAKE SYSTEM FOR A VEHICLE

[75] Inventors: Walter Steinhauser, Schwieberdingen; Guenter Kaes, Stuttgart; Wolfgang Maisch, Schwieberdingen, all of Fed. Rep. of Germany; Alwin Stegmaier, North Charleston, S.C.

[73] Assignee: Robert Bosch GmbH, Stuttgart, Fed. Rep. of Germany

[21] Appl. No.: 555,698

[22] Filed: Jul. 23, 1990

[30] Foreign Application Priority Data

Aug. 25, 1989 [DE] Fed. Rep. of Germany ....... 3928109

[51] Int. Cl.⁵ .............................................. B60T 8/34
[52] U.S. Cl. ......................... 303/113 TR; 303/115 EC
[58] Field of Search ........................ 303/116, 115, 113; 74/89.17; 267/156; 185/40 R

[56] References Cited

U.S. PATENT DOCUMENTS

| | | | |
|---|---|---|---|
| 3,895,814 | 7/1975 | Willetts | 267/258 X |
| 4,022,307 | 5/1977 | Berrié et al. | 192/120 |
| 4,166,657 | 9/1979 | Blomberg et al. | 188/181 A X |
| 4,619,151 | 10/1986 | Trachman et al. | 185/40 R X |
| 4,756,391 | 7/1988 | Agarwal et al. | 188/216 X |
| 4,805,965 | 2/1989 | Jonner et al. | 303/100 |
| 4,950,028 | 8/1990 | Harrison | 303/116 X |

FOREIGN PATENT DOCUMENTS 3707068 9/1988 Fed. Rep. of Germany .

Primary Examiner—Robert J. Oberleitner
Assistant Examiner—Lee W. Young
Attorney, Agent, or Firm—Edwin E. Greigg; Ronald E. Greigg

[57] ABSTRACT

A slip control system for a hydraulic brake system of a vehicle, which comprises a pressure generator having a plunger piston, which plunges into a cylinder filled with brake fluid and is connected to a rack. For the forward drive of the plunger piston, an electric drive motor is provided, which via a gear drive drives a pinion meshing with the rack. For the return drive of the plunger piston, a spiral spring is used that engages on one end with pinion shaft and on the other is supported on the pressure generator housing. The use of the spiral spring makes a short axial structural length of the pressure generator attainable. A grip roller free-wheel clutch is also provided in the drive train between the motor and the rack. The grip roller free-wheel clutch effects an uncoupling of the gear drive and the drive motor when the rack, at the end of the return stroke, strikes a stop of the pressure generator housing. This prevents damage to the gear drive and motor.

3 Claims, 3 Drawing Sheets

ELECTRIC-MOTOR-DRIVABLE PRESSURE GENERATOR FOR A HYDRAULIC BRAKE SYSTEM FOR A VEHICLE

BACKGROUND OF THE INVENTION

The invention is based on a pressure generator as defined hereinafter. A pressure generator of this type is already known from German Offenlegungsschrift 37 07 068, U.S. Pat. No. 4,805,965; in this pressure generator a rack engages a piston only in a force-locking manner upon a working stroke. To return the piston to its outset position, a helical compression spring is provided, which is disposed coaxially with the piston and thus increases the axial length of the pressure generator structure. The return of the piston is reinforced by a high hydraulic pressure in the brake system. While the return stroke of the piston is limited by a stop, the other end of the accelerated rack meets the piston of a second pressure generator. The drive motor is thus subjected to strong delaying forces.

OBJECT AND SUMMARY OF THE INVENTION

The pressure generator according to the invention has an advantage over the prior art in that on the one hand, its axial structural length is reduced, and on the other, after the stop of the piston, a decoupling from the drive mechanism prevents damage to the gear drive and motor. Moreover, by using the gear drive between the motor driven at high rpm and the pinion driven at low rpm, it becomes possible to use a small, weight-saving electric motor. By means of this gear drive which steps down the rpm of the drive motor, sensitive regulation of the pressure, generated with the plunger piston, can be attained.

The embodiment defined hereinafter has an advantage first that the spiral spring engages a part of the gear drive executing few rotations per piston stroke and therefore can be relatively small in size. Second, the free-wheel is disposed at a location at which virtually the entire gear drive and the motor are disconnectable from the abruptly braked piston and rack.

The arrangement of the invention makes it possible to attain not only favorable assembly of the components but also a self-contained flow of force, caused by the prestressing of the spiral spring, in one housing part.

Another provision of the invention embodying a site for tool access on the shaft end of the pinion is advantageous because it facilitates the prestressing of the spiral spring.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
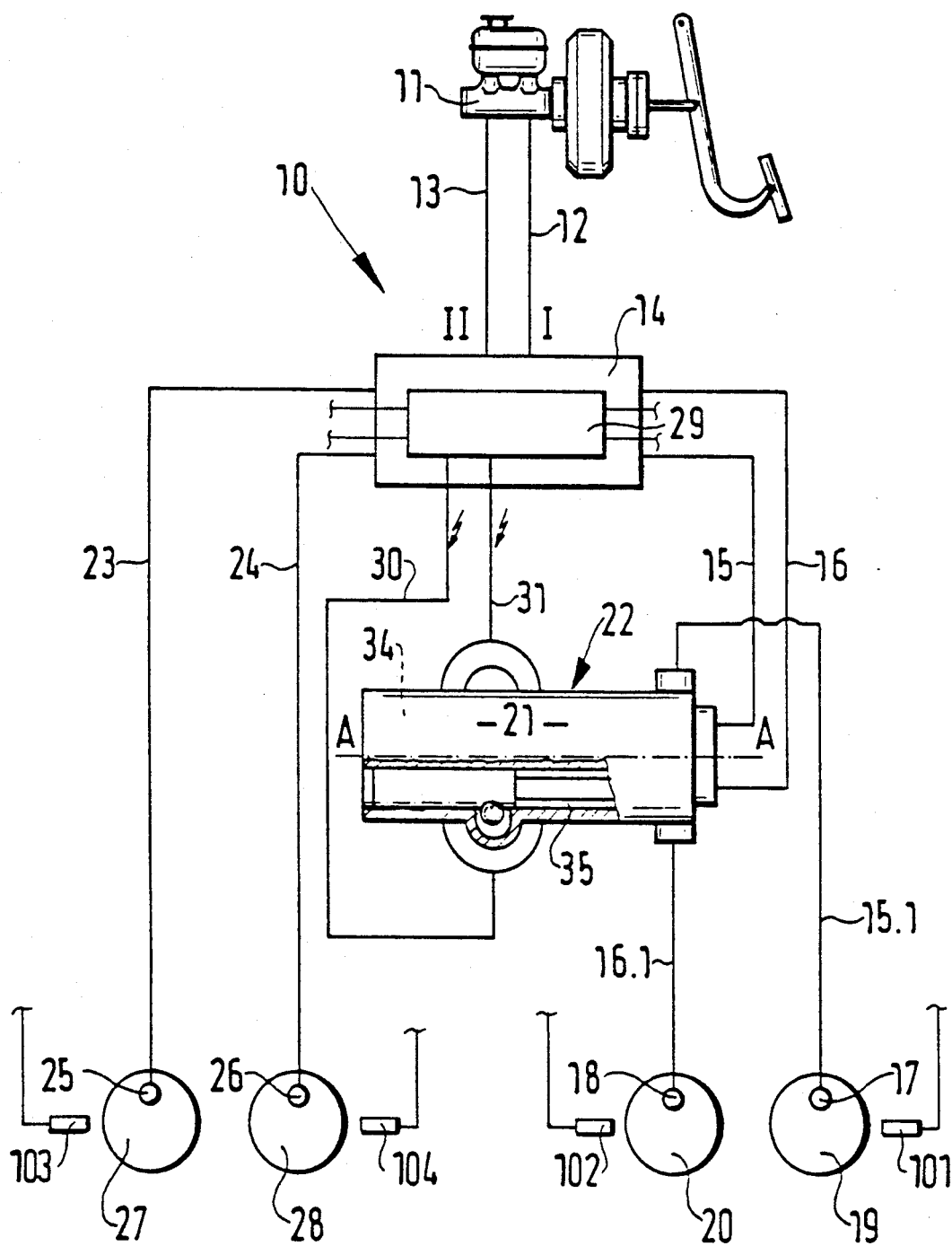
FIG. 1 schematically shows a hydraulic vehicle brake system having a pressure generator unit.

The layout of a hydraulic vehicle brake system 10 shown in FIG. 1 has a pedal-actuated master brake cylinder 11 for generating brake pressure. Connected to the master brake cylinder 11 are a master brake line 12 for a brake circuit I and a master brake line 13 for a brake circuit II. The master brake lines 12 and 13 discharge into a hydraulic unit 14 of an anti-skid apparatus. In the brake circuit I, wheel brake lines 15, 15.1 and 16, 16.1, respectively, lead from the hydraulic unit 14 to wheel brake cylinders 17 and 18 of the wheel brakes 19 and 20 of driven wheels of a first vehicle axle. One pressure generator unit 21 of an apparatus 22 for limiting drive slip, i.e., controlling traction, of the wheels of the first vehicle axle is located between the respective wheel brake lines 15 and 15.1 and 16 and 16.1. The pressure generator unit 21 is described in greater detail hereinafter. In the brake circuit II, wheel brake lines 23 and 24 are connected to the hydraulic unit 14. The wheel brake lines 23 and 24 lead to wheel brake cylinders 25 and 26 of the wheel brakes 27 and 28 of non-driven wheels of a second vehicle axis. An electronic control unit 29 for monitoring wheel rotation sensed by sensors 101, 102, 103 and 104, for triggering the hydraulic unit 14 for anti-skid operation or triggering the pressure generator unit 21 for traction control is also provided. Solenoids and a return pump, not shown in detail, are also incorporated in the hydraulic unit 14, so that in the event of the danger of locking of at least one wheel detected by well known wheel sensors, not shown, the brake pressure in the appropriate wheel brake cylinder can be lowered, maintained or raised as well known on the prior art. If wheel slip of at least one of the driven wheels arises, the control unit 29, via lines 30 and 31, switches the pressure generator 21 on, in order to feed brake pressure into the applicable wheel brake cylinder and synchronize the rpm of the driven wheels.

The pressure generator unit 21 has one pressure-generator 34 and 35, respectively, associated with the respective wheel brake cylinders 17 and 18. Since the pressure generators 34 and 35 are identical in structure and are disposed symmetrically to an axis A-A, the detailed illustration in FIGS. 2 and 3 and the ensuing description will be limited to the pressure generator 3 connected to the wheel brake lines 16 and 16.1.

The pressure generator 35 has a housing 39 substantially comprising a housing part 36, a connection head 37 and a gear box 38. The housing part 36 has an elongated cylindrical bore 40 in which a hollow cylinder 41 is fittingly guided longitudinally. On its end remote from the connection head 37, the bore 40 is limited by a stop sleeve 43 secured with a snap ring 42.

On its end toward the stop sleeve 43, the hollow cylinder 41 is connected to a coaxially extending plunger piston 46 of small diameter and relatively long axial length. The plunger piston 46, overlapped by the hollow cylinder 41 in virtually its entire length, extends in a fluid-tight manner within a cylinder 47 for receiving brake fluid. In the outset position of the pressure generator 35 shown in FIG. 2, the cylinder 47 engages the hollow cylinder 41 and is retained with a flange 48 between the housing part 36 and the connection head 37. Located inside the cylinder 47 is a tubular actuating element 51 for a seat valve 52, which is disposed in a chamber 53 of the pressure generator 35 defined by the connection head 37 and the cylinder 47. Connected to this chamber 53 is a line connection 54 leading via the wheel brake line 16 to the master brake cylinder 11 of the vehicle brake system 10, and a line connection 55 leading via the wheel brake line 16.1 to the wheel brake cylinder 18. The seat valve 52 is actuatable as a function of the position of the plunger piston 46 by means of the actuating element 51.

To displace the plunger piston 46, the hollow cylinder 41 is provided on the outside with a set of teeth 58 acting as a rack. Meshing with the teeth 58 is a pinion 59 of an axially parallel gear drive 61 (FIG. 3) connected to an electric drive motor 60. The gear drive has a first spur gear 62, which is engaged by a pinion 63 of the drive motor 60. The many-toothed spur gear 62 is connected in a manner fixed against relative rotation with a second spur gear 64 having fewer teeth, which meshes with a third, likewise many-toothed spur gear 67 supported on a shaft segment 65 of the pinion shaft 66. Between this spur gear 67 and the shaft segment 65 of the pinion shaft 66, there is a so-called grip roller freewheel clutch 68 which is known in the prior art. A grip roller free-wheel clutch of this kind is embodied with the size of a needle bearing and is connected such that it is automatically dependent on the rotational direction. The grip roller free-wheel clutch 68 transmits torque between the spur gear 67 and the pinion shaft 66 in one rotational direction.

The spur gears 62, 64 and 67 of the gear drive 61 are disposed in the gear box 38; contrarily, the shaft 66 of the pinion 59 extends both in the gear box 38 and in the housing part 36 of the pressure generator housing 39. The shaft 66 is supported in the gear box 38 and in the housing 36 with roller bearings 71 and 72. Toward the gear in the housing part 36, there is a recess 75, which is concentric with the longitudinal axis of the pinion shaft 66 and receives a spiral spring 76. Because the spiral spring 76 of the pressure generator 35 is located behind the pinion 59 in the housing part 36 in FIG. 2, where it cannot be seen, the housing part 36 is cut away in the upper half of the figure, and the corresponding spiral spring associated with the pressure generator 34 is shown instead. The spiral spring is anchored with its outer end 79 in a form-fitting manner to the housing part 36. With its inner end 78, the spiral spring 76 engages a grooved pin 79 fitted into the shaft 66 of the pinion 59.

The spiral spring 76, which has only a few windings, serves to restore the plunger piston 46 after its stroke. To generate a restoring torque, the spiral spring 76 must be prestressed in the following manner The end 82 of the pinion shaft 66 supported in the gear box 38 is equipped with a hexagonal socket 83 for engagement of a corresponding hexagonal tool. With the tool, which can be introduced through a bore 84 in the gear box 38, the spiral spring 76 is prestressed by rotating it counterclockwise (with respect to FIG. 2). Next, the hollow cylinder 41 is introduced into the bore 40 of the housing part 36, and the teeth 58 are made to mesh with the pinion 59. Then the stop sleeve 43 is introduced into the bore 40 and secured with the snap ring 42. Because of the prestressing of the spiral spring 76, the pinion 59 moves the hollow cylinder 41 toward the stop sleeve 43. As a result, further relaxation of the spiral spring 76 is precluded. The tool can be disengaged from the pinion shaft 66, and the bore 84 in the gear box 38 can be closed by a cap 85.

Figure 2:
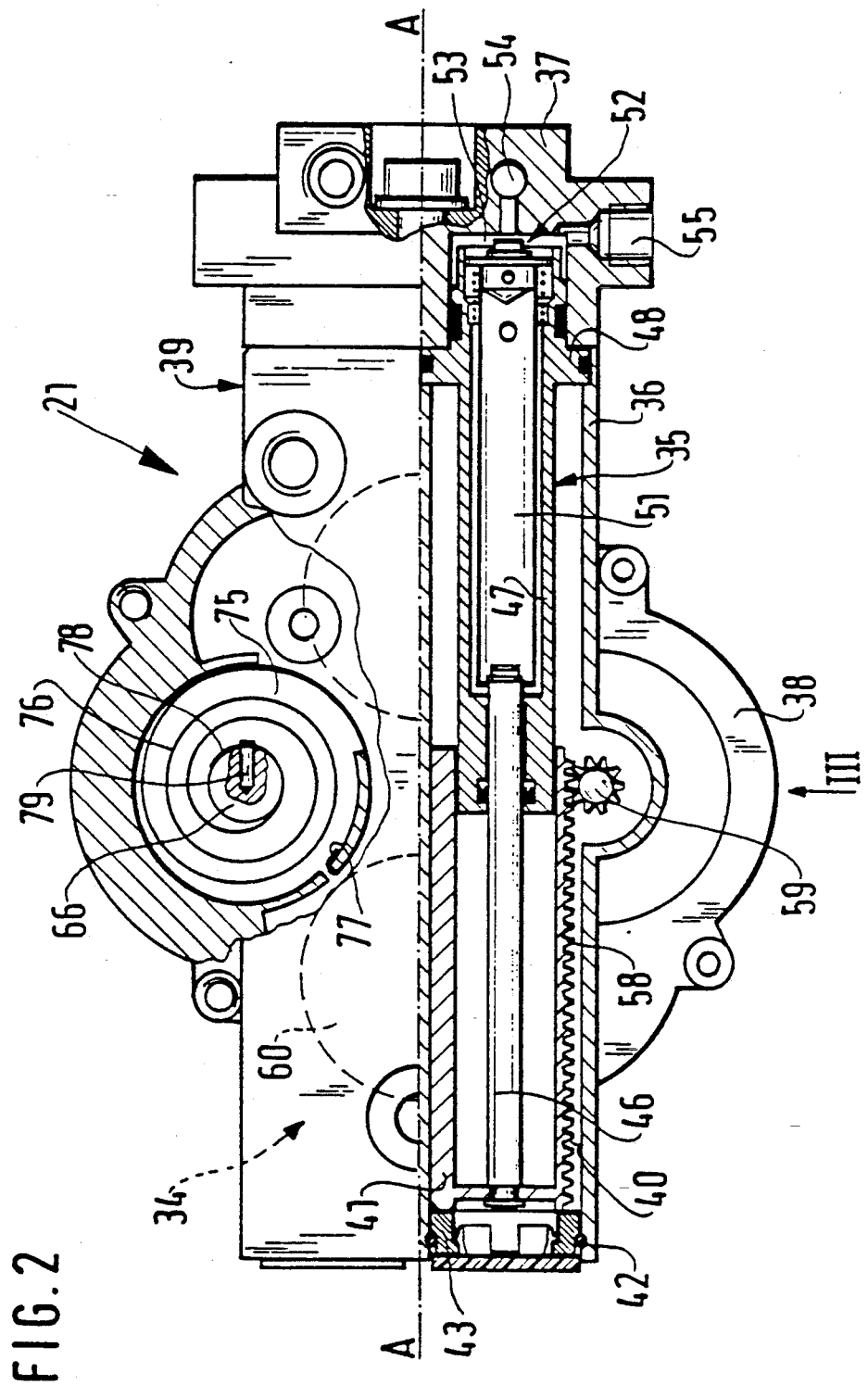
FIG. 2 shows the unit with a pressure generator in section taken along the line II—II in FIG. 3, on a scale enlarged from that of FIG. 1.
Figure 3:
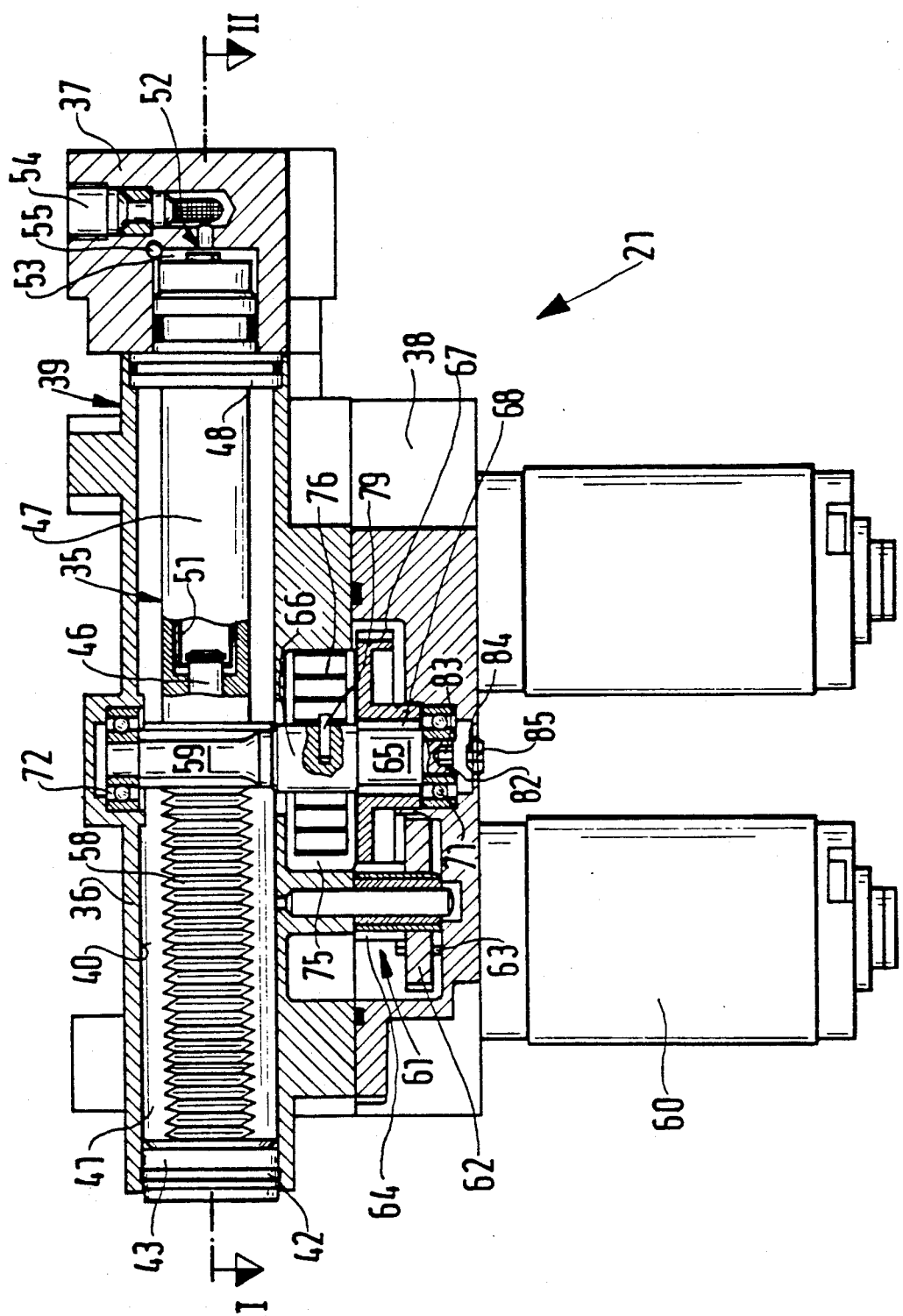
FIG. 3 is a view on the pressure generator with its drive mechanism in the direction of the arrow III of FIG. 2.

The function of the pressure generator 35 is as follows:

In normal vehicle operation, the plunger piston 46 is in its outset position shown in FIG. 2, so that the seat valve 52 is open and the pressure course between the master brake cylinder 11 and the wheel brake cylinder 18 is free. In service braking and anti-skid braking, brake pressure can therefore be built up or reduced in the wheel brake cylinders 17 and 18. Contrarily, the pressure generators 35 become operative whenever the control unit 29, upon startup and acceleration of the vehicle, ascertains drive slip, i.e., a loss of traction, at at least on wheel of the driven wheels of the vehicle associated with the wheel brakes 19 and 20. The control unit 29 now switches the drive motor 60 of the pressure generator 35 for the wheel slipping on. The motor 60, via the gear drive 61 and the pinion 59 engaging the teeth 58 of the hollow cylinder 41, now moves the plunger piston 46 out of its outset position. At the beginning of the working stroke, the plunger piston 46 effects the closure of the seat valve 52. This closes the pressure course to the master brake cylinder 11. As its stroke continues, the plunger piston 46 positively displaces brake fluid from the cylinder 47 through the wheel brake line 16.1 into the wheel brake cylinder 18 and builds up brake pressure there.

During this working stroke of the plunger piston 46, the free-wheel 68 is inactive; that is, it transmits torque between the spur gear 67 and the shaft 66 of the pinion 59. Furthermore, during the working stroke, the spiral spring 76 at one end engaging the shaft 66 of the pinion 59 and at the other engaging the housing part 36 is tightened beyond its prestressing provided upon assembly. The piston motion ends when synchronous rotation of the driven vehicle wheels is attained.

At the end of the acceleration process, the plunger piston 46 is returned to its outset position. In this process, both the high hydraulic brake pressure and the tensing force of the spiral spring 76 act in a restoring manner upon the plunger piston 46. However, in order that the return of the plunger piston 46 will not be effected abruptly, the drive motor 60 is switched in the drive rotational direction (as in the working stroke) with reduced torque by the control unit 29, so that the motor force reduces the restoring force. The drive motor 60 is thus used as a return travel brake during the return stroke of the plunger piston 46.

At the end of the return stroke, the plunger piston 46 opens the seat valve 52 by engagement with the actuating element 51 and makes the pressure course between the master brake cylinder 11 and the wheel brake cylinder 18 free again.

Immediately after that, the hollow cylinder 41 strikes the stop sleeve 43 and is braked abruptly. At the same time, the grip roller free-wheel clutch 68 now becomes active, decoupling the rotating inertia masses of both the drive motor 60 and the gear drive 61 from the pinion 59 and permitting them to slow down to a stop. This prevents destruction of the motor 60 or of the gear drive 61. This provision is particularly effective if the braking action of the drive motor 60 should be absent during the return stroke of the plunger piston 46, for instance from a loss of electrical power or by braking by the vehicle driver, or by shutoff of the on-board vehicle electrical system in traction control operation.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An electromotor-drivable pressure generator (35) for a hydraulic vehicle brake system (10), which has
    a plunger piston (46),
    a rack with teeth (58) connected at least indirectly to the plunger piston,
    between an electric drive motor (60) and the rack, wherein a pinion (59) on a pinion drive shaft of the toothed gear drive driven by the drive motor meshes with the rack,
    a spiral spring (76), one end of said spiral spring engaging said pinion drive shaft and on the other end at least indirectly engaging a housing part (36) of the pressure generator, said spiral spring being operative to restore said plunger piston to its outset position toward a stop sleeve (43) counter to an action of the drive motor,
    and a free-wheeling clutch system (68) between a shaft portion (65) of the pinion drive shaft and a gear wheel (67) mounted on the shaft portion, wherein upon arrival of the plunger piston on the stopsleeve, the free-wheeling clutch system disconnects the drive train between the drive motor and said pinion drive shaft.

2. A pressure generator as defined by claim 1, in which said spiral spring (76) is prestressed and inserted into a recess (75) of a housing part (36) of the pressure generator housing (39), said housing part (36) receives the rack with teeth (58), said stop sleeve (43) limits a restoration of the rack, and the pinion (59); and the spiral spring is form-fittingly anchored to the housing part (36) by its outer spring end (77).

3. A pressure generator as defined by claim 1, in which a shaft end (82) of the pinion (59) is embodied for engagement of a tool for tightening the spiral spring (76) when assembled.

* * * * *